US009722727B2

(12) United States Patent
Andgart et al.

(10) Patent No.: US 9,722,727 B2
(45) Date of Patent: Aug. 1, 2017

(54) MULTI-LEVEL ACK DEFINING DECODING MARGIN

(71) Applicant: Telefonaktiebolaget L M Ericsson (publ), Stockholm (SE)

(72) Inventors: Niklas Andgart, Sodra Sandby (SE); Peter Alriksson, Horby (SE); Joakim Axmon, Kavlinge (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 108 days.

(21) Appl. No.: 14/430,508

(22) PCT Filed: Mar. 5, 2015

(86) PCT No.: PCT/EP2015/054612
§ 371 (c)(1),
(2) Date: Mar. 23, 2015

(87) PCT Pub. No.: WO2016/138957
PCT Pub. Date: Sep. 9, 2016

(65) Prior Publication Data
US 2016/0261321 A1 Sep. 8, 2016

(51) Int. Cl.
*H04L 1/00* (2006.01)
*H04B 7/0456* (2017.01)
(Continued)

(52) U.S. Cl.
CPC ......... *H04L 1/0003* (2013.01); *H04B 7/0456* (2013.01); *H04L 1/0015* (2013.01);
(Continued)

(58) Field of Classification Search
None
See application file for complete search history.

(56) References Cited

U.S. PATENT DOCUMENTS 7,564,827 B2 * 7/2009 Das .................. H04B 7/264
370/342
2002/0046379 A1 4/2002 Miki et al.
(Continued)

FOREIGN PATENT DOCUMENTS

EP 1633069 A1 3/2006
EP 2166689 A1 3/2010
(Continued)

OTHER PUBLICATIONS

PCT International Search Report, mailed May 15, 2015, in connection with International Application No. PCT/EP2015/054614, all pages.
(Continued)

*Primary Examiner* — Min Jung
(74) *Attorney, Agent, or Firm* — Leffler Intellectual Property Law, PLLC

(57) ABSTRACT

The present disclosure relates to methods of transmitting and receiving transmission feedback in a radio network node. More particularly the disclosure pertains to transmitting and receiving messages acknowledging reception and successful decoding of a transport block in a radio network node. The disclosure also relates to a wireless device providing transmission feedback and to a radio network node receiving the transmission feedback. The disclosure proposes a method, performed in a radio network node, of receiving transmission feedback. The method comprises transmitting, using a set of transmission properties, a transport block to a receiving wireless device and receiving, from the receiving wireless device, an acknowledgement (ACK) confirming reception and successful decoding of the transport block in the receiving wireless device, wherein the ACK defines a decoding margin of the decoding. The disclosure also proposes a
(Continued)

corresponding method in a wireless device and corresponding devices as well as a corresponding computer program.

42 Claims, 8 Drawing Sheets

(51) Int. Cl.
*H04L 1/18* (2006.01)
*H04L 5/00* (2006.01)
*H04L 1/16* (2006.01)

(52) U.S. Cl.
CPC .......... *H04L 1/0031* (2013.01); *H04L 1/1671* (2013.01); *H04L 1/1819* (2013.01); *H04L 5/0048* (2013.01); *H04L 5/0055* (2013.01); *H04L 1/0009* (2013.01); *H04L 1/1685* (2013.01)

(56) References Cited

U.S. PATENT DOCUMENTS

| | | |
|---|---|---|
| 2002/0178417 A1 | 11/2002 | Hall et al. |
| 2004/0228320 A1 | 11/2004 | Laroia et al. |
| 2007/0049207 A1 | 3/2007 | Haghighat |
| 2011/0004796 A1* | 1/2011 | Hsuan ..................... H04L 12/66 714/748 |
| 2011/0276851 A1* | 11/2011 | Nagaraja ................ H04L 1/1607 714/748 |
| 2013/0166983 A1 | 6/2013 | Graumann |
| 2013/0182582 A1* | 7/2013 | Bontu ................. H04B 7/15592 370/246 |
| 2013/0294357 A1* | 11/2013 | Shimanuki ............ H04L 1/0003 370/329 |
| 2015/0078270 A1* | 3/2015 | Seo ........................ H04W 52/46 370/329 |
| 2016/0056912 A1* | 2/2016 | Froc ................... H04B 10/0779 398/27 |

FOREIGN PATENT DOCUMENTS

| | | |
|---|---|---|
| EP | 2383924 A1 | 11/2011 |
| EP | 2 663 007 A1 | 11/2013 |
| WO | 2004075023 A2 | 9/2004 |
| WO | 2007/062754 A1 | 6/2007 |
| WO | 2011/140398 A1 | 11/2011 |

OTHER PUBLICATIONS

PCT International Search Report, mailed Nov. 19, 2015, in connection with International Application No. PCT/EP2015/054612, all pages.

3GPP TS 36.213, V10.12.0 "Evolved Universal Terrestrial Radio Access (E-UTRA); Physical layer procedures (Release 10)" Mar. 2014, Sections 7.1.7.1 and 7.2.3, pp. 1-5, 33-34, 63-66.

* cited by examiner

MULTI-LEVEL ACK DEFINING DECODING MARGIN

TECHNICAL FIELD

The present disclosure relates to methods of transmitting and receiving transmission feedback to a radio network node. More particularly the disclosure pertains to transmitting and receiving messages acknowledging reception and successful decoding of a transport block in a wireless device. The disclosure also relates to a wireless device providing transmission feedback and to a radio network node receiving the transmission feedback.

BACKGROUND

The 3rd Generation Partnership Project, 3GPP, is responsible for the standardization of the Universal Mobile Telecommunication System (UMTS) and Long Term Evolution, LTE. The 3GPP work on LTE is also referred to as Evolved Universal Terrestrial Access Network (E-UTRAN). LTE is a technology for realizing high-speed packet-based communication that can reach high data rates both in the downlink and in the uplink, and is thought of as a next generation mobile communication system relative to UMTS. In order to support high data rates, LTE allows for a system bandwidth of 20 MHz, or up to 100 MHz when carrier aggregation is employed. LTE is also able to operate in different frequency bands and can operate in at least Frequency Division Duplex (FDD) and Time Division Duplex (TDD) modes.

Hybrid Automatic Repeat reQuest (HARQ) is an integral part of the 3G and 4G standards that allows reliable communication between a wireless device and a network node by means of incremental redundancy. The transport block to be transmitted is subjected to forward error correction encoding by which redundancy is introduced. The number of bits increases due to the introduced redundancy, but not all bits are sent at the same time. The resulting bits are segmented into several so called redundancy versions, where each such redundancy version further is punctured before being sent in order to fit it within the given allocation (one or more resource block pairs). How much is punctured is depending on how many bits (information plus redundant bits) that can be carried in the allocation, which further is depending on the allocation bandwidth, the modulation (e.g. QPSK, 16QAM, 256QAM) in use, and the presence of broadcasted signals and channels in the allocated bandwidth. The ratio between the information bits and information bits plus redundant bits in a transport block is referred to as code rate. The combination of code rate and modulation type is referred to as Modulation and Coding Scheme.

In case the maximum number of retransmissions is reached without the receiving entity being able to decode the transport block, it will be detected by higher layers e.g. Radio Link Control, RLC, generally within 50-100 ms that a Protocol Data Unit (PDU) is missing and a retransmission is requested for all transport blocks that comprise the RLC PDU, even those that may have been successfully. This is referred to as Automatic Repeat request (ARQ) and has considerably larger latency than HARQ retransmissions.

In a LTE network, a wireless device (in LTE referred to as a User Equipment, UE) carries out measurements to provide indications to the base station (in LTE eNodeB) on the perceived radio propagation conditions in what is called Channel Quality Indicator (CQI) reporting. Based on the reporting the base station can decide roughly which Modulation and Coding Scheme (MCS) to use for communication with the UE. One example of mapping between CQI and MCS is shown in Table 1 below, which is the retrieved from 3GPP TS 36.213 V10.12.0 section 7.2.3. In low channel quality (low CQI index) more forward error correction encoding is needed for successful decoding of the information bits, and vice versa in high channel quality i.e. high CQI index. Hence at high CQI the throughput of information bits can be made higher than at low CQI.

TABLE 1

4-bit CQI table from 3GPP

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

In order to get a good system throughout the base station, in LTE referred to as an eNB, carries out link adaptation by which it matches each UE's reported channel quality to an MCS that provides the right balance between system throughput and throughput for the individual user. The MCS is indicated to the UE in the Downlink Control Information (DCI) provided over Physical Data Control Channel, PDCCH in LTE. This is shown in Table 2 which is the retrieved from 3GPP TS 36.213 V10.12.0 section 7.1.7.1.

In addition to CQI reporting, a base station typically has an outer loop that based on ACK/NACK reports tunes in the MCS value to a suitable value giving a BLER (ratio between NACKs and total number of received or expected ACK/NACKs) of e.g. 10%. Besides catering for flexibility in which target BLER is used (e.g. 1%, 10%, 30%), it also solves the problem that each UE model or even UEs of the same model may have an individual bias in the reported CQI. The base station thus maintains a UE-specific CQI offset which it tunes to give the desired BLER target.

TABLE 2

Modulation and TBS index table for PDSCH

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |

TABLE 2-continued

Modulation and TBS index table for PDSCH

| MCS Index $I_{MCS}$ | Modulation Order $Q_m$ | TBS Index $I_{TBS}$ |
|---|---|---|
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

Existing control loops on base station side for determining the UE-specific MCS are largely based on maintaining a particular BLER ratio and identifying UE-specific bias in the CQI reporting. Once the CQI bias has been identified the base station can more accurately select MCS based on the CQI reported by the UE. During identification of the CQI bias the base station will decrease or increase the MCS until the BLER target is met over some interval of time.

The expansion of machine-type communication (MTC) toward industrial applications is seen as one of the key features in future communication systems. The requirements on connectivity are very diverse and largely depend on the use case of an industrial application to be operated. Therefore, different Critical-MTC (i.e., ultra-reliable MTC) solutions will be needed. Besides the end-to-end latency, the Critical-MTC concept should address the design trade-offs regarding transmission reliability, mobility, energy-efficiency, system capacity and deployment, and provide solutions for how to design a wireless network in a resource and energy efficient way while enabling ultra-reliable communication.

For scheduling of UEs that are to fulfill extreme requirements on BLER, e.g. down to $10^{-9}$, while at the same time fulfilling extreme requirements on latency, i.e. being able to send and receive new information every sub frame, block errors have to be avoided as far as possible.

With existing implementation it may however be problematic to adjust to e.g. a proper MCS without introducing block errors occasionally and as a result the base station (or network node) is forced to be very conservative in the MCS selection. Being conservative implies using a lower/less aggressive MCS than called for, resulting in that more resources are used for the particular UE than necessary, with reduced system throughput as result.

SUMMARY

An object of the present disclosure is to provide a method which seeks to mitigate, alleviate, or eliminate one or more of the above-identified deficiencies in the art and disadvantages singly or in any combination.

This is obtained by a method, performed in a radio network node, of receiving transmission feedback. The method comprises transmitting, using a set of transmission properties, a transport block to a receiving wireless device and receiving, from the receiving wireless device, an acknowledgement, ACK, confirming reception and successful decoding of the transport block in the receiving wireless device, wherein the ACK defines a decoding margin of the decoding. The decoding margin may be utilized in different ways by the base station. For example, the network node can have an outer loop based on margin of decoding instead of on BLER for the category of UEs supporting high reliability and low latency, and may thereby tune in to correct MCS value without losing any packets.

Another example would e.g. be to use the decoding margin or statistics thereof, to identify areas, in e.g. a factory, where the coverage for UEs supporting high reliability and low latency is not sufficient and thus needs to be improved.

According to some aspects, the method further comprises reconfiguring the transmission properties to be used for transmissions of one or more further transport blocks to the receiving wireless device, based on the margin of the decoding. Since less conservative MCS will be used for the UE, more resources will be available to other UEs and the system throughput will improve.

According to some aspects, the method further comprises calculating an accumulated decoding margin, representing the decoding margin of previous and present transport blocks transmitted, using the set of transmission properties, between the radio network node and the wireless device, wherein the reconfiguring is based on the accumulated decoding margin.

According to some aspects, the margin of the decoding comprises an indication of a portion of a processing capacity of the radio network node that was used for the reception and/or decoding of the transport block.

According to some aspects, the receiving implies receiving information defining one of several possible ACK levels, wherein each level corresponds to a decoding margin within a pre-defined range. Hence, a UE or wireless device may decide whether to send "Soft ACK" or "Hard ACK" for a successfully decoded block based on how close to its physical layer processing capacity it is. It may for instance be how many of the turbo decoder iterations that are remaining when successfully decoding the block, or similar kind of metrics.

Then the base station may, instead of maintaining a target BLER, maintain a target "Soft ACK" Ratio, SAR. Tuning the MCS based on SAR allows the base station to be more aggressive when searching for a proper MCS, as it can do so without introducing block errors.

According to some aspects, the disclosure relates to a radio network node configured for receiving transmission feedback. The radio network node comprises a radio communication interface and processing circuitry. The processing circuitry is configured to transmit, through the radio communication interface using a set of transmission properties, a transport block to a receiving wireless device. The processing circuitry is further configured to receive, through the radio communication interface, from the receiving wireless device, an acknowledgement, ACK, confirming the reception and successful decoding of the transport block in the receiving wireless device. The ACK defines a decoding margin of the decoding. The processing circuitry is further configured to reconfigure the transmission properties to be used for transmissions of one or more further transport blocks to the receiving wireless device, based on the margin of the decoding.

According to some aspects, the disclosure relates to a method, performed in a wireless device, of providing transmission feedback. The method comprises receiving a transport block from the radio network node, decoding the transport block, transmitting, to the radio network node, an acknowledgement, ACK, of the reception and successful decoding of the transport block, wherein the ACK defines a decoding margin of the decoding.

The exchange of acknowledgements including a decoding margin enables the network node to be less conservative when selecting MCS for the device, thereby allowing more resources to be used for other UEs. As a consequence the system throughput can be improved while at the same time offering highly reliable communication with the device.

According to some aspects, the ACK defines one of several possible ACK levels, wherein each ACK level corresponds to a decoding margin within a pre-defined range.

According to some aspects, the margin of the decoding comprises an indication of a share of a processing capacity of the radio network node that was used for the reception or decoding of the transport block. According to some aspects, the processing capacity is the processing capacity of a digital signal processor implementing physical layer processing.

According to some aspects, the margin of the decoding indicates a number of iterations of the decoding. According to some aspects, the margin of the decoding indicates a number of hardware units being activated or used during the reception and/or decoding.

According to some aspects, the disclosure relates to a wireless device configured for providing transmission feedback. The wireless device comprises a radio communication interface and a processing circuitry. The processing circuitry is configured to receive, through the radio communication interface, a transport block from the radio network node and to decode the transport block. The wireless device is further configured to transmit, through the radio communication interface, to the radio network node, an acknowledgement, ACK, confirming the reception and successful decoding of the transport block, wherein the ACK defines a decoding margin of the decoding.

The disclosure also relates to a computer program comprising computer program code which, when executed in a programmable controller of a radio network node, causes the radio network node to execute the methods described above and below.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

ABBREVIATIONS

Figure 1A:
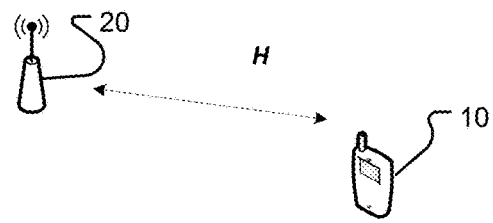
FIG. 1a is illustrating a radio network node and a wireless device.

ACK Acknowledged
ARQ Automatic repeat request
BLER Block error rate
CQI Channel quality indicator
CRS Cell specific reference signals
CSI Channel state information
DCI Downlink control information
DL Downlink
eICIC Enhanced ICIC
FFT Fast Fourier transform
HACK Hard ACK
HARQ Hybrid automatic repeat request
ICIC Inter-cell interference coordination
MCS Modulation and coding scheme
NACK Not Acknowledged
OFDM Orthogonal Frequency Division Modulation
PCFICH Physical control format indicator channel
PDCCH Physical downlink control channel
PDSCH Physical downlink shared channel
PHICH Physical HARQ indication channel
PUCCH Physical uplink control channel
PUSCH Physical uplink shared channel
PDU Protocol data unit
QoS Quality of service
RLC Radio link control
SACK Soft ACK
SAR Soft-to-Hard ACK rate
SG Scheduling grant
SR Scheduling request
SRS Sounding reference signals
TTI Transmission time interval
UCI Uplink control information
UE User equipment
UL Uplink

DETAILED DESCRIPTION

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

Incremental redundancy allows a wireless device to attempt to receive and decode a first redundancy version of the transport block, and in case it fails, it receives a second redundancy version of the transport block, which it combines with the first one in so called soft combining and tries to decode. (Re)-transmissions of the same transport block occur at minimum 8 ms distance unless features such as Transmission time interval, TTI, bundling are used, by which several redundancy versions are transmitted in subsequent sub frames without waiting for feedback on whether a previous redundancy version was successfully decoded.

The receiving entity, wireless device or base station, provides feedback to the transmitting entity on whether it decoded the transport block successfully, ACK, or whether it failed, NACK. The transmitting entity then can decide on whether to transmit another redundancy version for the same block, or send a redundancy version for a next transport block.

There is prior art revealing the usage of multiple NACK levels (i.e. when a transmission is not received successfully) for different purposes and different content e.g. quality level, although sometimes referred to as partial ACK. For example European patent application EP2663007A1 discloses a method for transmission of positive acknowledgement messages and negative acknowledgement messages from a first network device to a second network device for data packets received at the first network device, wherein each of said negative acknowledgement messages indicates one quality level of at least two different quality levels dependent on a quality of a data packet received at the first network device, and a differentiation between positive acknowledgement messages and negative acknowledgement messages has a stronger error protection than a differentiation between negative acknowledgement messages indicating different quality levels.

For extreme requirements on high reliability in combination with low latency one cannot afford NACK for the control of e.g. the MCS. Therefore, this disclosure proposes the possibility to send multiple ACK levels, i.e. acknowledgements transmitted when a transmission is received successfully. The multiple ACK levels indicate a margin of successful decoding.

Hence, the proposed solution is to introduce a finer granularity in the ACK reporting from a wireless device. The existing HARQ implementation typically allows binary reporting (ACK or NACK), or possibly several NACK levels. To better allow tuning of MCS on the base station side without introducing more block errors one may introduce two or more levels of ACK, e.g., "Soft ACK", and "Hard ACK", where Soft ACK indicates that the block was decoded by the UE with low margin to exhaustion of physical layer processing resources, and Hard ACK indicates that the block was decoded with a good such margin.

The inventors have realized that it may be useful for the transmitter to know, how close to its limit in terms of physical layer capacity, the receiver is operating. It may for instance be how many of the turbo decoder iterations that are remaining when successfully decoding the block, or similar kind of metrics.

Figure 1B:
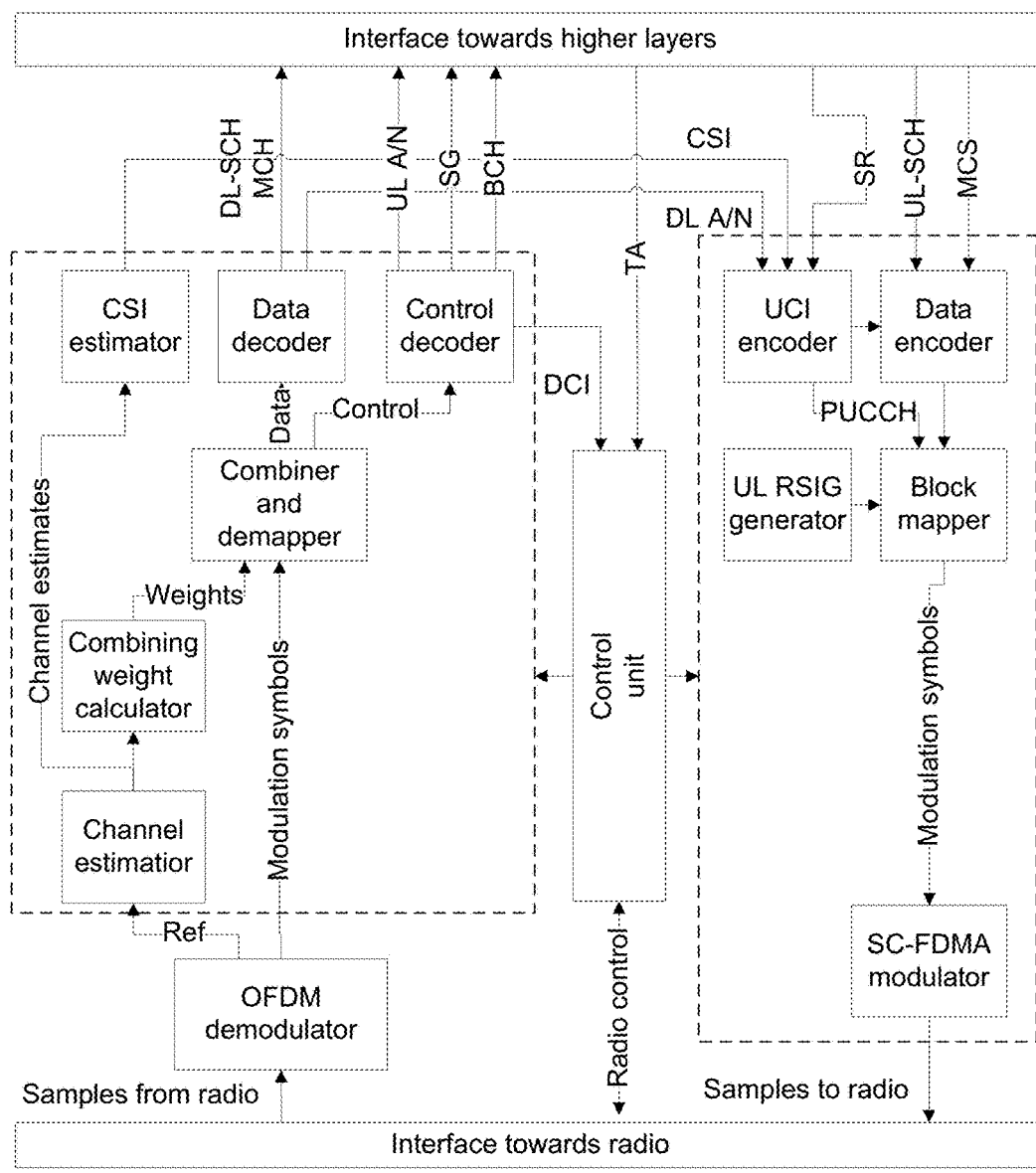
FIG. 1b is a sketch of LTE physical layer downlink and uplink processing.

A simplified sketch of the LTE physical layer in a UE is provided in FIG. 1b. Samples are received from the radio, and subjected to an FFT in the OFDM demodulator. The output comprises resource elements carrying e.g. modulation symbols and reference signals. The reference signals are used by the Channel estimator for estimating the radio channel, and from the channel estimates and information on transmission mode and allocated bandwidth the optimum combining weights are derived by the Combining weight calculator. Some reference signals are also used by the CSI estimator for calculating channel state information (CSI, including CQI) which is fed back to the network node. Received modulation symbols and combining weights are fed to the Combiner and demapper which produces soft bits, which further are input to either of the decoders, depending on channel.

The UE first receives and decoded PDCCH (physical downlink control channel) to find downlink control information (DCI) providing information on allocations on PDSCH (physical downlink shared channel) as well as the transmission mode and modulation and coding scheme (MCS) in use, uplink allocations (scheduling grant; SG), uplink power control commands, etc. However before receiving it the UE decodes the physical control format indicator channel (PCFICH) which tells how large the control region is, i.e., how many of the initial OFDM symbols in the subframe are carrying PDCCH. Also, before the decoding the radio propagation channel needs to be estimated and combining weights be produced.

PDCCH is convolutional encoded and is decoded by the Control decoder. The decoded DCI is fed to the Control unit which is used for configuring the baseband. The Control decoder further outputs feedback from the network node on whether transmissions on the uplink were successfully decoded or not (UL ACK/NACK; UL A/N), and is also used for decoding the master information block (MIB) carried on PBCH (physical broadcast channel).

Once the DCI has been decoded, generally at a point in time about in the middle of the subframe, the PDSCH is next. Remaining reference signals in the subframe are used for improving the channel estimates, combining weights are tailored for the transmission mode in use, and then the received modulation symbols are combined and demapped, resulting in soft bits to be subjected to decoding. Since the whole subframe has to be received before the decoding can start, timing-wise this happens in the following subframe, in a pipelined fashion, while control information is received and decoded.

PDSCH is turbo encoded and it is decoded using the Data decoder which mainly comprises hybrid automatic request (HARQ) functionality with associated soft bit combiner, and a turbo decoder. The turbo decoder iterates the decoding until the received data is successfully decoded (as indicated by a successful cyclic redundancy check; CRC) or until running out of time (iterations). In case of failure to decode it may give up earlier if metrics indicate that not much more information is corrected in subsequent iterations, so called early give-up function (EGF). Due to the pipelined fashion of processing the turbo decoder has to finish within the duration of one subframe. Feedback on whether data was successfully decoded or not (ACK/NACK; DL A/N) is provided to the network node in subframe n+4, where subframe n is the subframe where the data was received.

The CSI reporting may be either periodical, by which the UE knows beforehand when it is to be reported, but may also be a periodical by which the UE gets informed in the DCI that a CSI report is to be sent in subframe n+4.

The processing time for the OFDM demodulator, Channel Estimator, Combining weight calculator, Combiner and demapper, and Control decoder is highly dependent on the bandwidth in use, whereas the processing time for the Data decoder mainly depends on the UE category which is dictating the size of the HARQ buffers.

When the UE has received an SG in subframe n, it is to transmit on the physical uplink shared channel (PUSCH) in subframe n+4. Scheduling requests (SR), DL A/N, and CSI constitute the uplink control information (UCI) which is encoded by the UCI encoder. Data to be transmitted is encoded by the Data encoder which carriers out Turbo encoding, and then UCI is inserted. The modulation symbols are fed to the Block mapper, which maps the modulation symbols and uplink reference symbols, produced by UL RSIG generator, to the granted allocation. The resulting sequences of symbols are fed to the SC-FDMA modulator which essentially carries out an IFFT, and the output is sent to the radio.

In case no scheduling grant is received but the UE is to provide UL A/N, CSI and SR, the information is transmitted on the physical uplink control channel (PUCCH) according to a predefined format.

The processing time for UL RSIG generator, Block mapper, and SC-FDMA modulator is highly dependent on the bandwidth in use, whereas the processing time for Data encoder is depending on the UE category.

Further, due to timing advance, TA, and the standard stipulating that cell radius up to 100 km shall be supported, the uplink subframe n may have to be transmitted 0.67 ms before downlink subframe n has been received. Hence the UE will have to be able to do all data- and CSI-related processing of a subframe within roughly 2 ms, to meet the times for DL A/N, acting on aperiodic CSI reporting requests, acting on UL A/N from network node, etc.

It shall be noted that due to cost and power effectiveness a UE is generally designed with just the processing capacity, memory size, etc. needed for the supported features and capabilities, e.g. number of DL and UL carriers, respectively, and supported bandwidth for each of them. This is reflected e.g. by that the FFTs and IFFTs are designed to meet the deadlines on OFDM symbol basis, but not much quicker.

Hence, this disclosure proposes informing a base station about the constraints of the physical layer of the UE. The base station may then, instead of maintaining a target BLER, maintain a target Soft ACK Ratio, SAR. Tuning the MCS based on SAR allows the base station to be more aggressive when searching for a proper MCS, as it can do so without introducing block errors. Since less conservative MCS will be used for the UE, more resources will be available to other UEs and the system throughput will improve.

The proposed technique of providing extended transmission feedback will now be described in further detail, using LTE as an example.

It should be noted that although terminology from 3GPP LTE is used herein to explain the example embodiments, this should not be seen as limiting the scope of the example embodiments to only the aforementioned system. Other wireless systems, including Wifi, WCDMA, WiMax, UMB and GSM, and future radio access systems may also benefit from the example embodiments disclosed herein.

FIG. 1a illustrates a communication system comprising a radio network node, in LTE an eNodeB 20, and a wireless device 10, in LTE a UE, where the proposed technique may be implemented. In this example the eNodeB 20 transmits a transport block to the UE 10, whereby the UE acknowledges successful reception and indicated a margin of the successful decoding using the proposed technique. Thereby, the UE informs the eNodeB how strained the resources of the physical layer, shown in FIG. 1b, are.

Example Node Operations

A method performed in the radio network node 20, of receiving transmission feedback in accordance with the proposed technique, will now be described with reference to FIG. 2.

Figure 2:
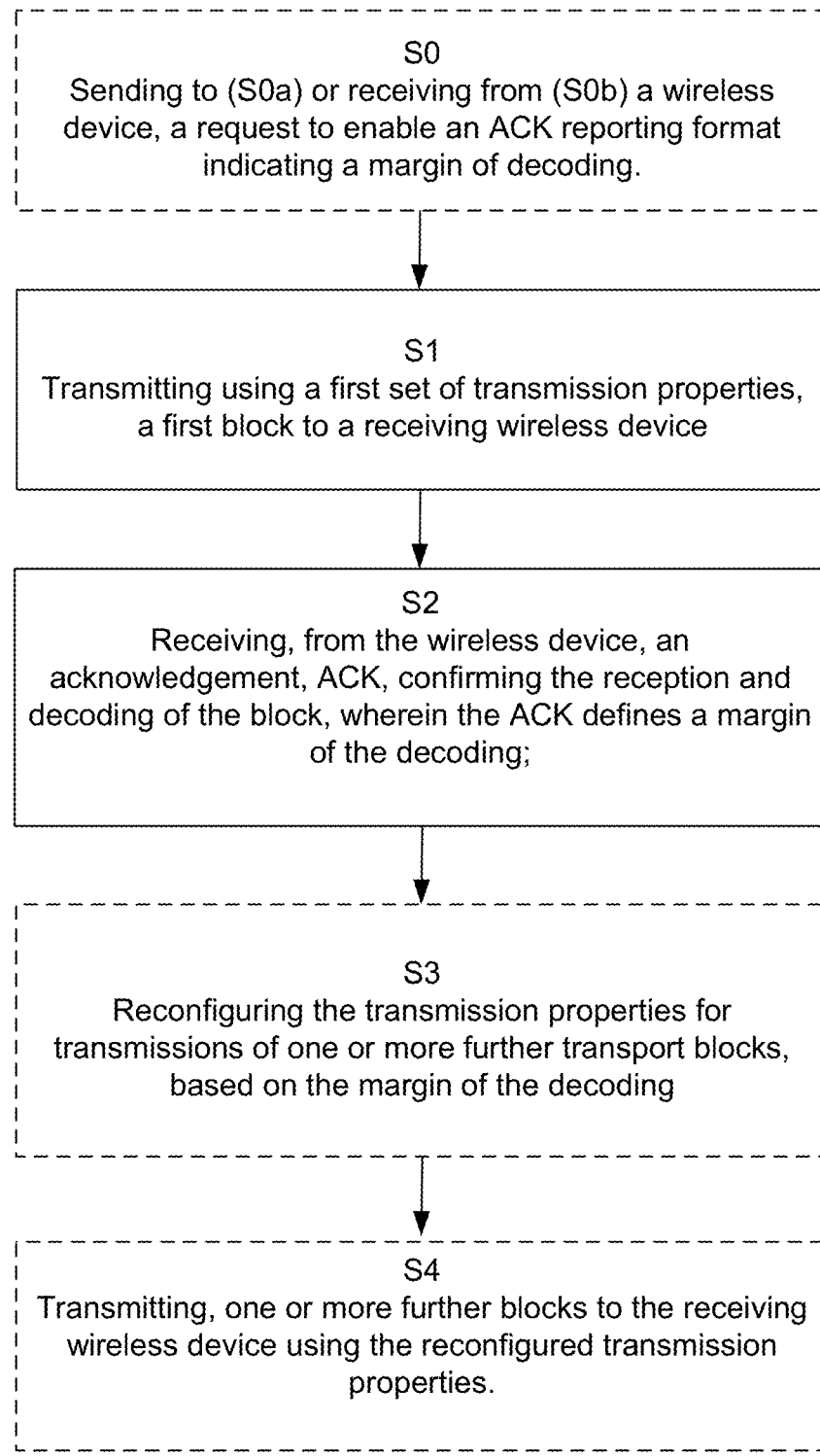
FIG. 2 is a flowchart illustrating embodiments of method steps in a radio network node.

It should be appreciated that FIG. 2 comprises some operations which are illustrated with a solid border and some operations which are illustrated with a dashed border. The operations which are comprised in a solid border are operations which are comprised in a broader example embodiment. The operations which are comprised in a dashed border are example embodiments which may be comprised in, or a part of, or are further operations which may be taken in addition to the operations of the solid border example embodiments. It should be appreciated that the operations need not be performed in order. Furthermore, it should be appreciated that not all of the operations need to be performed. The example operations may be performed in any suitable order and in any combination.

The proposed methods or signaling may be enabled either from the wireless device or from the network node. For example a UE reports a capability regarding multi-level ACK, and may get configured with a Physical Uplink Control Channel, PUCCH, format (not presently in the standard) that allows multi-level ACK reporting. Such information might also be provided explicitly or implicitly in a QoS request, be tied to a particular UE class, or be mandated in the standard from UEs supporting a particular release thereof (e.g. 3GPP EUTRA Rel.13). Typically there is some signaling between the network node and a receiving wireless device resulting in that an ACK reporting format indicating a margin of decoding is enabled.

Hence, according to some aspects, the method is initiated by the network node sending S0a a request to enable an ACK reporting format indicating a margin of decoding, to the receiving wireless device 10. Alternatively, the method is initiated by the network node, receiving S0b a request to enable an ACK reporting format indicating a margin of decoding from the receiving wireless device 10. The initial signaling may be a part of enabling mission critical operation, which is affecting other functions as well.

Now turning back to FIG. 2, the proposed method comprises the step of transmitting S1, using a set of transmission properties, a transport block to a receiving wireless device 10. A transport block is group of bits or digits that are transmitted as a unit and that may be encoded for error-control purposes. The transport block is e.g. carrying a RLC PDU. Transmission properties here refer to the physical configuration of the receiver. According to some aspects, the transmission properties comprise one or several of the following properties: Modulation and Coding Scheme, Radio Access Technology, Multiple Input Multiple Output transmission modes, Beam forming, Pre-coding Matrix and Transmission Power.

The method further comprises receiving S2, from the receiving wireless device 10, an acknowledgement, ACK, confirming reception and successful decoding of the transport block in the receiving wireless device 10. The acknowledgement is a signal passed between communicating devices to signify acknowledgement, or receipt of response, as part of a communications protocol. In other words, the receiving wireless device indicated that the transport block was successfully decoded and the no retransmissions are required. According to the present disclosure, the ACK further defines a decoding margin of the decoding. Or in other words, the ACK comprises information indicative of the decoding margin of the successful decoding.

Information indicative of a decoding margin is e.g. decoding margin. The decoding margin defines the share of the available resources, e.g. processing capacity, in the wireless device that was required to successfully decode the block. In principle, the decoding margin will reflect other blocks in the physical layer described above as well. However, the information indicative of a decoding margin may include other metrics as well reflecting the steps before the decoder.

Different metrics may be used to define the decoding margin such as time, iterations or active blocks or units.

Hence, the ACK comprises information indicating the constraints of receiving wireless device associated with the successful decoding of the transport block. The constraint may e.g. be indicated as a part of a total capacity. Thus, according to some aspects, the margin of the decoding comprises an indication of a portion of a processing capacity of the radio network node 20 that was used for the reception and/or decoding of the transport block.

According to some aspects, the information indicative of a decoding margin comprises an indication of a share of a processing capacity of the radio network node 20 or the wireless device 10, that was used for the reception and/or decoding of the first transport block. According to some aspects, the processing capacity is the processing capacity of one or more digital signal processors implementing physical layer processing of the unit performing the decoding.

According to some aspects, the margin of the decoding indicates a number of iterations of the decoding. One example is turbo decoder iterations as described in connection with FIG. 1b. Hence, if a number of iterations above a predefined threshold were required to decode the transport block, then a Soft ACK is transmitted. This indicates that the effort needed to decode the transport block was big.

According to some aspects, the margin of the decoding indicates a number of hardware units being activated or used during the reception and/or decoding of the transport block. For example, if several receiver branches or receiver antennas that are active a Soft ACK is transmitted. E.g., the acknowledged present mode requires the UE to use 2 Rx antennas but it may have 4 and can therefore enable more antennas to improve the reception. Then a Hard ACK would be transmitted, indicating a smaller effort.

Other examples of hardware units are processing units or memory units. The information indicative of a decoding margin could also be calculated based on a combination of iterations, hardware units and other parameters.

According to some aspects, the receiving S2 implies receiving information defining one of several possible ACK levels, wherein each level corresponds to a decoding margin within a pre-defined range. Stated differently, the decoding margin is an indication on whether decreasing the robustness of the transmission S1, would cause a severe risk in unsuccessful decoding. This aspect implies that one or more ACK levels are introduced; wherein each ACK level represents a decoding margin, i.e. how much of its capacity or how much effort the receiver and/or decoder had to use in order to successfully decode the block. For example Soft ACK and Hard ACK, where Soft ACK indicates that the UE successfully decoded the block but just barely so. Hard ACK indicates that the block was successfully decoded with good margin. By receiving Soft ACK the base station is informed that there is a risk due to channel variations that a subsequent package will fail. However, Hard ACK indicates that there may be unnecessary overhead in the transmission. The UE may decide whether to send Soft ACK or Hard ACK for a successfully decoded block based on how close to its physical layer processing capacity it is. According to some aspects, the method further comprises reconfiguring S3 the transmission properties to be used for transmissions of one or more further transport blocks to the receiving wireless device 10, based on the margin of the decoding. In other words, the radio network node may utilize the margin of the decoding in order to maximize utilization of network resources.

According to some aspects, the reconfiguring S3 comprises changing the robustness of transmissions of one or more further transport blocks to the receiving wireless device 10, in relation to robustness of the transmission of the transport block. The robustness is the risk of block errors and is typically dependent on resource use.

According to some aspects, the reconfiguring S3 comprises selecting transmission properties corresponding to a robustness which is higher than the robustness of the transmission of the transport block, if the margin of the decoding is below a predefined level. According to some aspects, reconfiguring S3 comprises selecting transmission properties corresponding to a robustness which is lower than the robustness of the transmission of the transport block, if the margin of the decoding is above a predefined level. In other words, if the information indicative of a decoding margin is high, the network node may choose to select a less robust transmission in any way. Such a predefined level may be predefined or dynamically adjusted based on the current circumstances or services used. For C-MTC a specific level may be used.

Hence, robustness is typically increased by adding resources or decreased by reducing resources. Resources are e.g. physical resources or radio resources (time and/or frequency).

According to some aspects, robustness is adjusted by transmitting on the downlink using transmit diversity instead of using spatial diversity even should the UE have reported channel conditions (rank via RI) that would allow spatial diversity to be used (MIMO).

According to some aspects, robustness is be adjusted by combining other means than MCS alone. For instance, downlink transmissions may use different power offsets between data and reference symbols for the UE allocation, or may apply ICIC/eICIC to improve the reception of a UE at the cell border.

Robustness may also be adjusted by transmitting on the downlink using transmit diversity instead of using spatial diversity even should the UE have reported channel conditions (rank via RI) that would allow spatial diversity to be used (MIMO).

Robustness may be adjusted by changing other parameters than MCS alone. For instance, downlink transmissions may use different power offsets between data and reference symbols for the UE allocation, or may apply ICIC/eICIC to improve the reception of a UE at the cell border.

Robustness may also be adjusted by transmitting on the downlink using transmit diversity instead of using spatial diversity even should the UE have reported channel conditions (rank via RI) that would allow spatial diversity to be used (MIMO).

Typically, the robustness is not changed directly, but based on an average decoding margin e.g. ratio between SACK and HACK. This ratio in turn controls whether the robustness level is to be changed. This is similar to existing outer loop link adaptation, where MCS offset is adjusted to have a BLER of e.g. 10%.

Hence, according to some aspects, the method further comprises calculating S35 an accumulated decoding margin, representing the decoding margin of previous and present transport blocks transmitted, using the set of transmission properties, between the radio network node 20 and the wireless device 10. Then the reconfiguring S4 is based on the accumulated decoding margin.

According to some aspects, the method further comprises transmitting S4, using the reconfigured transmission properties, one or more further transport blocks to the receiving wireless device 10.

A corresponding method, performed in a wireless device 10, of providing transmission feedback, to a radio network node 20 will now be described with reference to FIG. 3. Hence the following method steps may be implemented in a device when receiving a transport block. As described above, the extended ACK format may be enabled through some signaling between the network node and the wireless device. According to some aspects, the method further comprises sending S10a request to enable an ACK reporting format indicating a margin of decoding, to the radio network node 20. According to some aspects, the method further comprises receiving S10b a request to enable an ACK reporting format indicating a margin of decoding from a radio network node 20.

Figure 3:
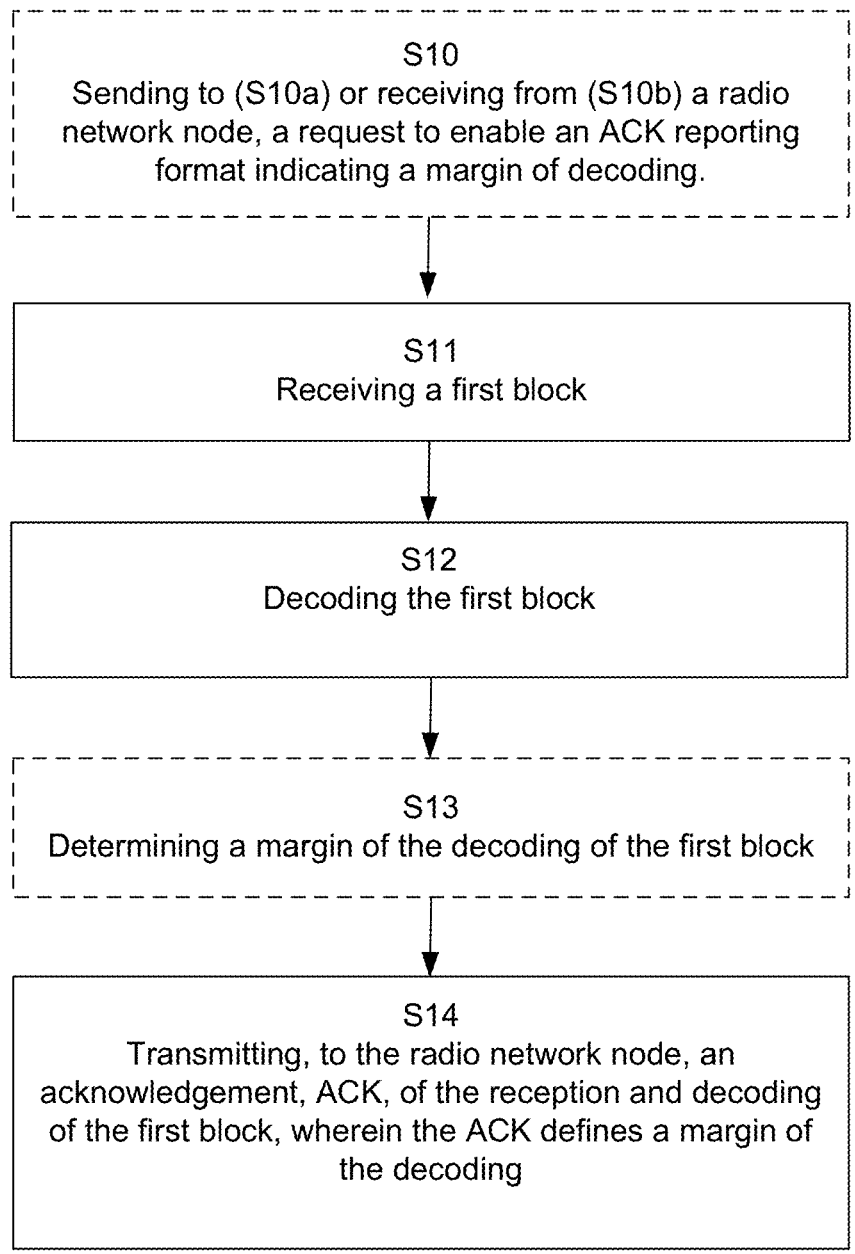
FIG. 3 is a flowchart illustrating embodiments of method steps in a wireless device.

It should be appreciated that FIG. 3 comprises some operations which are illustrated with a solid border and some operations which are illustrated with a dashed border. The operations which are comprised in a solid border are operations which are comprised in the broader example embodiment. The operations which are comprised in a dashed border are example embodiments which may be comprised in, or a part of, or are further operations which may be taken in addition to the operations of the broader example embodiments. It should be appreciated that the operations need not be performed in order. Furthermore, it should be appreciated that not all of the operations need to be performed. The example operations may be performed in any suitable order and in any combination.

The proposed method of providing feedback comprises receiving S11 a transport block from the radio network node 20 and decoding S12 the transport block. In other words this step implies that the transport block transmitted in step S1 is received in the wireless device. When decoding the block a decoding margin is determined, step S13. The decoding margin may e.g. be determined by reading values or data from the decoder or from a memory.

The method then comprises transmitting S14, to the radio network node 20, an acknowledgement, ACK, of the reception and successful decoding of the transport block, wherein the ACK defines a decoding margin of the decoding. According to some aspects, the ACK defines one of several possible ACK levels, wherein each ACK level corresponds to a decoding margin within a pre-defined range.

According to some aspects, the margin of the decoding comprises an indication of a share of a processing capacity of the radio network node 20 that was used for the reception or decoding of the transport block.

According to some aspects, the processing capacity is the processing capacity of one or more digital signal processors implementing physical layer processing.

According to some aspects, the margin of the decoding indicates a number of iterations of the decoding. One example is turbo decoder iterations as described in connection with FIG. 1b. Hence, if a number of iterations above a predefined threshold were required to decode the transport block, then a Soft ACK is transmitted. This indicates that the effort needed to decode the transport block was big.

According to some aspects, the margin of the decoding indicates a number of hardware units being activated or used during the reception and/or decoding. For example, if several receiver branches or receiver antennas that are active a SACK is transmitted. E.g., the acknowledged present mode requires the UE to use 2 Rx antennas but it may have 4 and can therefore enable more antennas to improve the reception. Then a Hard ACK would be transmitted, indicating a smaller effort.

Other examples of hardware units are processing units or memory units. The decoding margin could also be calculated based on a combination of iterations, hardware units and other parameters.

Figure 4A:
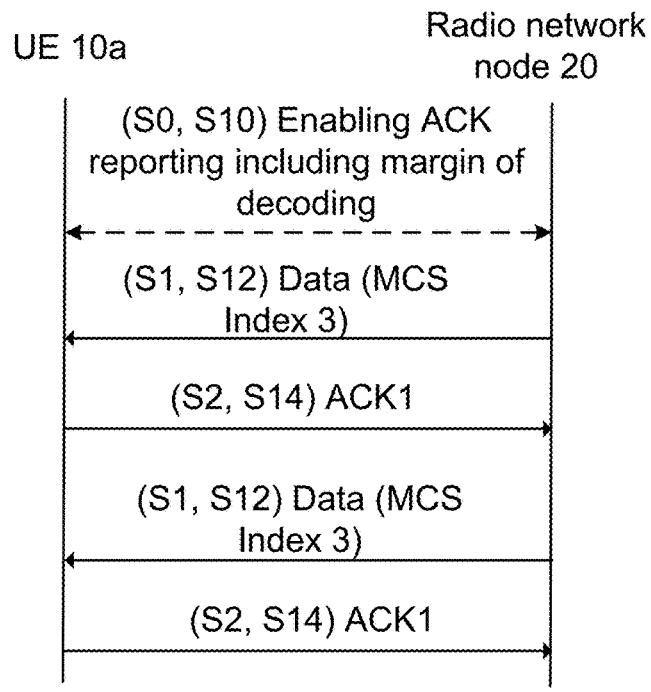
FIGS. 4a and 4b are illustrating the signaling between a radio network node and a wireless device in accordance with the proposed technique.
Figure 4B:
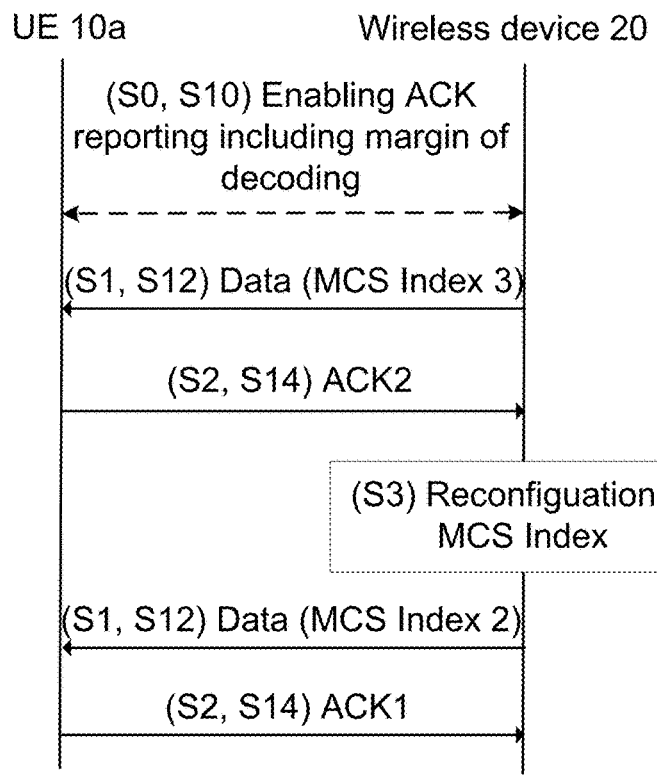

FIGS. 4a and 4b are signaling diagrams illustrating the signaling between a radio network node and a wireless device.

In FIG. 4a the radio network node is transmitting using Modulation and Coding Scheme with index 3. In this example the wireless device responds with a Soft ACK, here called ACK1. This indicates that the decoding margin is below a threshold. In this example the radio network node therefore does not change its transmission properties.

In FIG. 4b the radio network node is also transmitting using Modulation and Coding Scheme with index 3. However, in the example of FIG. 1b the wireless device responds with a Hard ACK, here called ACK2. This indicates that the decoding margin is above a threshold. In this example the radio network node therefore does changes its transmission properties to use a less robust modulation scheme in order to free up resources. This can be done with a low risk of losing packets because it is known that the decoding margin is low. Note that this is a simplified example. A more likely implementation would be to accumulate ACKs over time and change the MCS when the rate of HACK is above a level.

Example Node Configuration of a Radio Network Node

Figure 5:
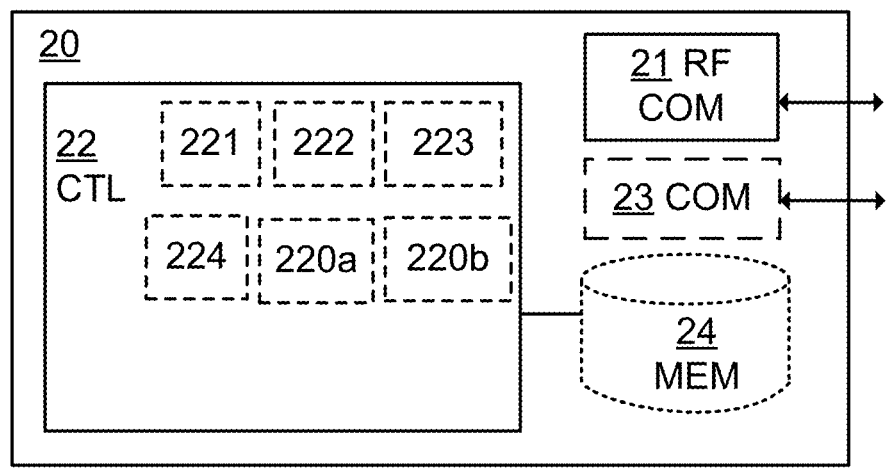
FIG. 5 is an example node configuration of a radio network node, according to some of the example embodiments.

FIG. 5 illustrates an example of a radio network node 20 which may incorporate some of the example node operation embodiments discussed above. As shown in FIG. 5, the radio network node 20 may comprise a radio communication interface 21 configured to receive and transmit any form of communications or control signals within a network. It should be appreciated that the radio communication interface 21 may be comprised as any number of transceiving, receiving, and/or transmitting units or circuitry. It should further be appreciated that the radio communication interface 21 may be in the form of any input/output communications port known in the art. The radio communication interface 21 may comprise RF circuitry and baseband processing circuitry (not shown).

The radio network node 20 may comprise a network communication interface 23 configured to exchange any form of communications or control signals with a core network and/or with other network nodes. The network communication is typically referred to as a backhaul.

The radio network node 20 may further comprise at least one memory unit or circuitry 24 that may be in communication with the radio communication interface 21. The memory 24 may be configured to store received or transmitted data and/or executable program instructions. The memory 24 may also be configured to store any form of beam-forming information, reference signals, and/or feedback data or information. The memory 24 may be any suitable type of computer readable memory and may be of volatile and/or non-volatile type. According to some aspects, the disclosure relates to a computer program comprising computer program code which, when executed in a radio network node, causes the radio network node to execute any aspect of the example node operations described above.

The radio network node 20 may further comprise further a controller or processing circuitry 22 configured to transmit, through the radio communication interface 21 using a set of transmission properties, a transport block to a receiving wireless device 10, to receive, through the radio communication interface 21, from the receiving wireless device 10, an acknowledgement, ACK, confirming the reception and successful decoding of the transport block in the receiving wireless device 10, wherein the ACK defines a decoding margin of the decoding.

The processing circuitry 22 may be any suitable type of computation unit, e.g. a microprocessor, digital signal processor (DSP), field programmable gate array (FPGA), or application specific integrated circuit (ASIC) or any other form of circuitry. It should be appreciated that the processing circuitry need not be provided as a single unit but may be provided as any number of units or circuitry. The processing circuitry is further adapted to perform all the aspects of the method in a network node described above and below.

According to some aspects, the processing circuitry 22 is further configured to reconfigure the transmission properties to be used for transmissions of one or more further transport blocks to the receiving wireless device 10, based on the margin of the decoding.

According to some aspects, the processing circuitry 22 is further configured to transmit, using the reconfigured transmission properties, one or more further transport blocks to the receiving wireless device 10.

According to some aspects, the processing circuitry 22 is further configured to reconfigure the transmission properties to be used for transmissions of one or more further transport blocks to the receiving wireless device 10 by changing the robustness of transmissions of one or more further transport blocks to the receiving wireless device 10, in relation to robustness of the transmission of the transport block.

According to some aspects, the processing circuitry 22 is further configured to reconfigure the transmission properties to be used for transmissions of one or more further transport blocks to the receiving wireless device 10 by selecting transmission properties corresponding to a robustness which is higher than the robustness of the transmission of the transport block, if the margin of the decoding is below a predefined level.

According to some aspects, the processing circuitry 22 is further configured to reconfigure the transmission properties to be used for transmissions of one or more further transport blocks to the receiving wireless device 10 by selecting transmission properties corresponding to a robustness which is lower than the robustness of the transmission of the transport block, if the margin of the decoding is above a predefined level.

According to some aspects, the processing circuitry 22 is further configured to calculate S35 an accumulated decoding margin, representing the decoding margin of previous and present transport blocks transmitted, using the set of transmission properties, between the radio network node 20 and the wireless device 10. Then the processing circuitry 22 is further configured to reconfigure the transmission properties to be used for transmissions of one or more further transport blocks to the receiving wireless device 10 based on the accumulated decoding margin.

According to some aspects, the transmission properties comprise one or several of the following properties: Modulation and Coding Scheme, Radio Access Technology, Multiple Input Multiple Output transmission modes, Beamforming, Pre-coding Matrix and Transmission Power.

According to some aspects, the margin of the decoding comprises an indication of a portion of a processing capacity of the radio network node 20 that was used for the reception and/or decoding of the transport block.

According to some aspects, the processing circuitry 22 is further configured to receive information defining one of several possible ACK levels, wherein each level corresponds to a decoding margin within a pre-defined range.

According to some aspects, the processing circuitry 22 is further configured to send a request to enable an ACK reporting format indicating a margin of decoding, to the receiving wireless device 10.

According to some aspects, the processing circuitry 22 is further configured to receive a request to enable an ACK reporting format indicating a margin of decoding from the receiving wireless device 10.

According to some aspects, processing circuitry 22 comprises a transmitter module 221 configured to transmit, through the radio communication interface 21 using a set of transmission properties, a transport block to a receiving wireless device 10. The processing circuitry further comprises a receiver module 222 configured to receive, through the radio communication interface 21, from the receiving wireless device 10, an acknowledgement, ACK, confirming the reception and successful decoding of the transport block in the receiving wireless device 10, wherein the ACK defines a decoding margin of the decoding.

According to some aspects, the processing circuitry further comprises a sender module 220a configured to send a request to enable an ACK reporting format indicating a margin of decoding, to the receiving wireless device 10.

According to some aspects, the processing circuitry further comprises a receiver module 220b configured to receive a request to enable an ACK reporting format indicating a margin of decoding from the receiving wireless device 10.

According to some aspects, the processing circuitry further comprises a reconfiguration module 223 configured to reconfigure the transmission properties to be used for transmissions of one or more further transport blocks to the receiving wireless device 10, based on the margin of the decoding.

According to some aspects, the processing circuitry further comprises a transmitter module 224 configured to transmit, using the reconfigured transmission properties, one or more further transport blocks to the receiving wireless device 10.

Example Node Configuration of a Wireless Device

Figure 6:
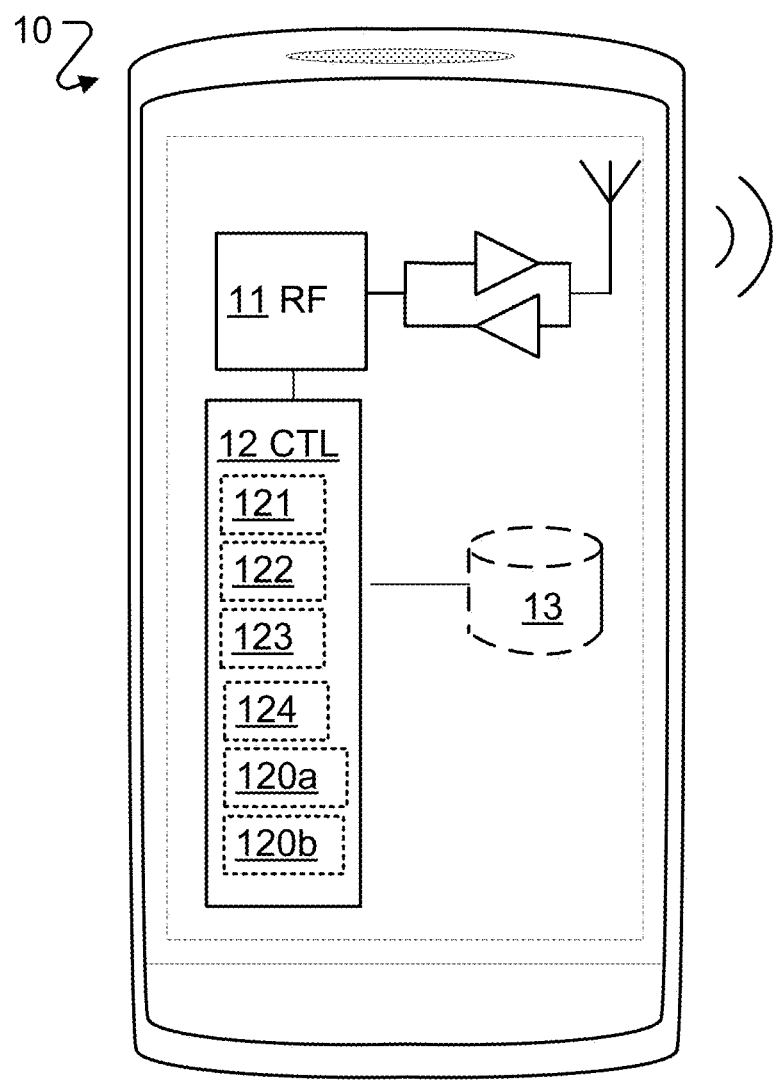
FIG. 6 is an example node configuration of a wireless device, according to some of the example embodiments.

FIG. 6 illustrates an example of a receiving wireless device 10 which may incorporate some of the example node operation embodiments discussed above. As shown in FIG. 6, the wireless device 10 may comprise a radio communication interface 11 configured to receive and transmit any form of communications or control signals within a network. It should be appreciated that the radio communication interface 11 may be comprised as any number of transceiving, receiving, and/or transmitting units or circuitry. It should further be appreciated that the radio communication interface 11 may be in the form of any input/output communications port known in the art. The radio communication interface 11 may comprise RF circuitry and baseband processing circuitry (not shown).

The wireless device 10 may further comprise at least one memory unit or circuitry 13 that may be in communication with the radio communication interface 11. The memory 13 may be configured to store received or transmitted data and/or executable program instructions. The memory 13 may also be configured to store any form of beam-forming information, reference signals, and/or feedback data or information. The memory 13 may be any suitable type of computer readable memory and may be of volatile and/or non-volatile type. According to some aspects, the disclosure relates to a computer program comprising computer program code which, when executed in the wireless device, causes the wireless device to execute any aspect of the example node operations described above.

The wireless device 10 may further comprise a controller or processing circuitry 12 which may be configured to receive, through the radio communication interface 11, a transport block from the radio network node 20 and to decode the transport block. The processing circuitry 13 is further configured to transmit, through the radio communication interface 11, to the radio network node 20, an acknowledgement, ACK, confirming reception and successful decoding of the transport block, wherein the ACK defines a decoding margin of the decoding.

The processing circuitry 12 may be any suitable type of computation unit, e.g. a microprocessor, digital signal processor (DSP), field programmable gate array (FPGA), or application specific integrated circuit (ASIC) or any other form of circuitry. It should be appreciated that the processing circuitry need not be provided as a single unit but may be provided as any number of units or circuitry. The processing circuitry is further adapted to perform all the aspects of the method in a wireless device described above and below.

According to some aspects, the ACK defines one of several possible ACK levels, wherein each ACK level corresponds to a decoding margin within a pre-defined range.

According to some aspects, the margin of the decoding comprises an indication of a share of a processing capacity of the radio network node 20 that was used for the reception or decoding of the transport block.

According to some aspects, the processing capacity is the processing capacity of one or more digital signal processor implementing physical layer processing. For example, the margin of the decoding indicates a number of iterations of the decoding or a number of hardware units being activated or used during the reception and/or decoding.

According to some aspects, the processing circuitry 12 is configured to send a request to enable an ACK reporting format indicating a margin of decoding, to the radio network node 20 or to receive a request to enable an ACK reporting format indicating a margin of decoding from a radio network node 20.

According to some aspects the processing circuitry comprises modules configured to perform the methods described above. Hence, according to some aspects, the processing circuitry 12 comprises a receiver module 121 configured to receive, through the radio communication interface 11, a transport block from the radio network node 20 and a decoder module 122 configured to decode the transport block. The processing circuitry 13 is further comprises a transmitter module 124 configured to transmit, through the radio communication interface 11, to the radio network node 20, an acknowledgement, ACK, of the reception and successful decoding of the transport block, wherein the ACK defines a decoding margin of the decoding.

According to some aspects, the processing circuitry further comprises a sender module 120a configured to send to a wireless device, a request to enable an ACK reporting format indicating a margin of decoding.

According to some aspects, the processing circuitry further comprises a receiver module 120b configured to receive from a wireless device, a request to enable an ACK reporting format indicating a margin of decoding.

According to some aspects, the processing circuitry further comprises a determiner 123 configured to determine a decoding margin of the decoding of the first block.

Two example implementations will now be described referring to FIGS. 7 and 8. Note that in FIGS. 7 and 8 letters a-d are used to show details of the method steps of FIGS. 3 and 4. For example steps S2a, S2b, S2c and S2d in FIG. 8 correspond to the more general step S2 in FIG. 3.

Example Implementation in UE

Figure 7:
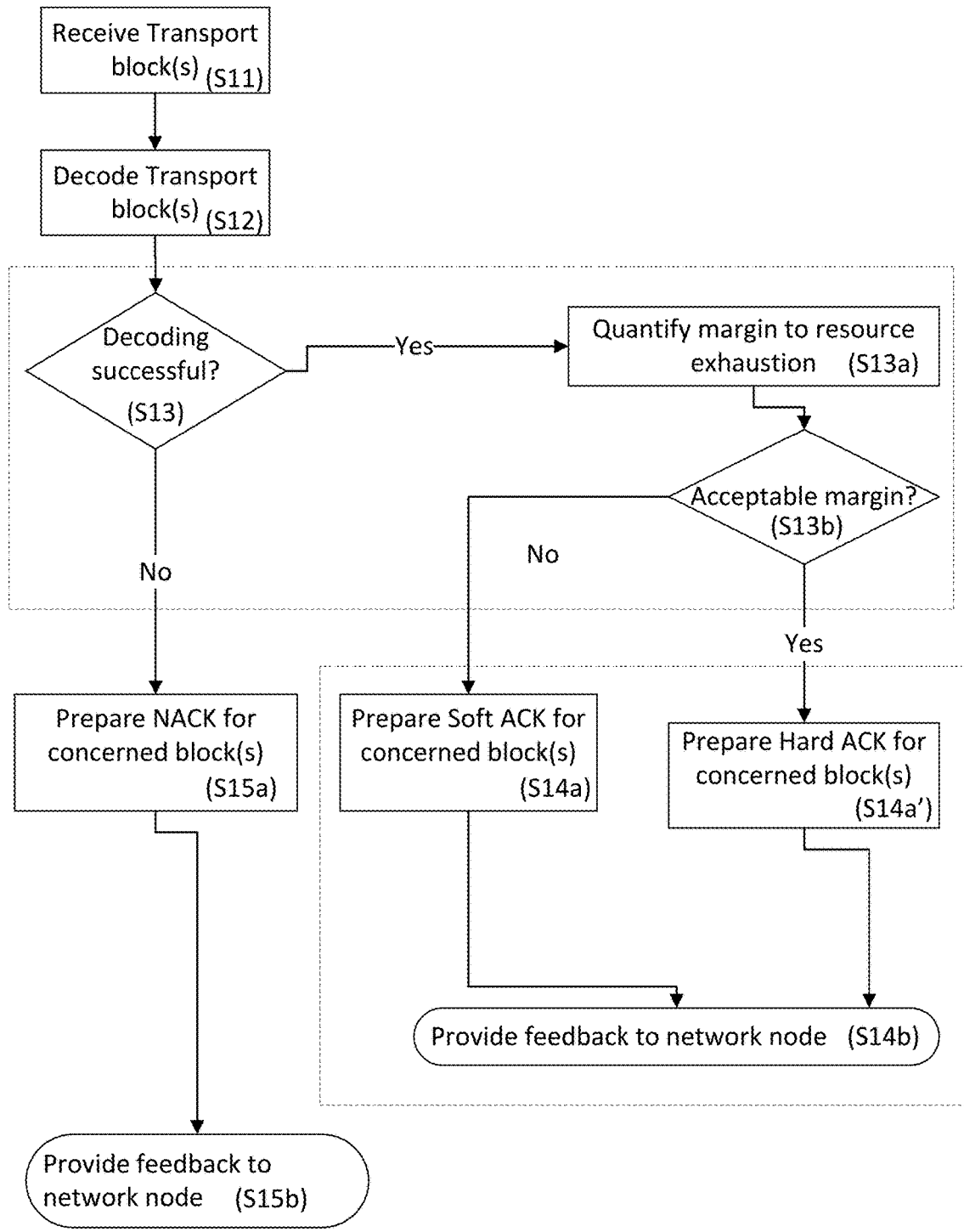
FIG. 7 is a flowchart showing example processing steps of the disclosure on base station side in one example embodiment.

Example processing steps of the disclosure on UE side for downlink reception are shown in FIG. 7.

The UE receives S11 a transport block of data which it tries to decode S12. If the decoding fails S13; NO, the UE prepares a NACK S15a and sends it to the base station S15b. If on the other hand the decoding is successful S13; YES, the UE quantifies which margins it had in the decoding S13a. Margins may be how many more turbo decode iterations, other kinds of iterations (e.g. successive interference cancellation, sphere decoding), processing and/or memory resources that could have been utilized had the decoding not succeeded at the point when it did. To make it concrete, if the turbo decoder was utilized up to 80% of its capacity or budget, the UE may find that there is sufficient margin in the used MCS S13b; YES and hence prepares a Hard ACK S14a' to be sent to the base station S14b. If on the other hand less than 20% of the capacity in terms of iterations is remaining, it may consider the margin being too small S13b; NO and prepares a Soft ACK S14a to be sent to the base station S14b.

Example Implementation in a Network Node

Figure 8:
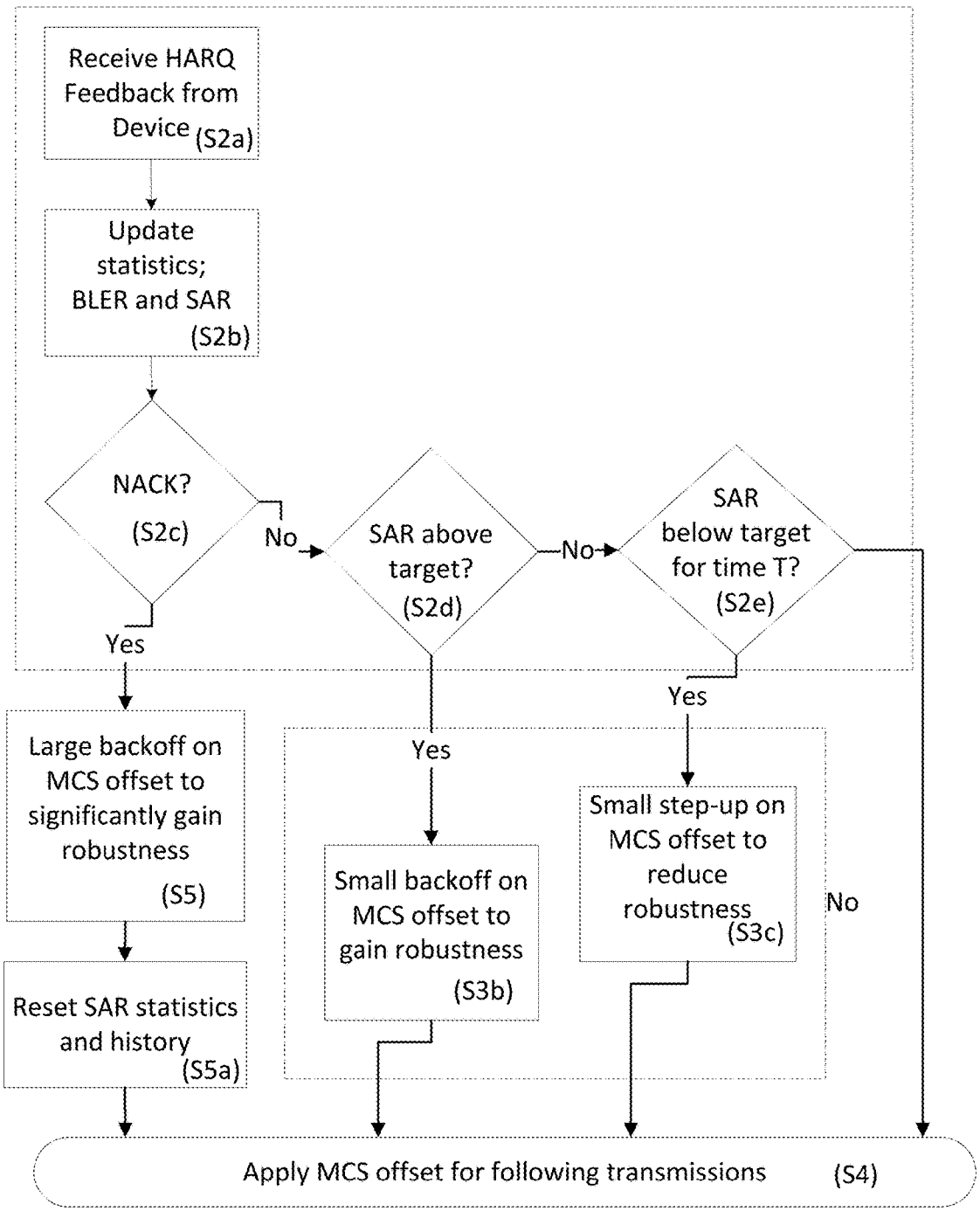
FIG. 8 is a flowchart showing example processing steps in a wireless device in one example embodiment.

Example processing steps of the disclosure on base station side for downlink transmission are shown in FIG. 8.

The base station receives a HARQ indicator from the UE S2a, and updates S2b the statistics and history for BLER and SAR S2b. History may here for instance be a buffer containing the N most recent NACKs and ACKs (Soft or Hard the same) for BLER, and Soft ACKs and Hard ACKs for SAR. The buffered data is used for calculating the BLER and SAR, respectively.

In case a NACK is received S2c; YES, the base station immediately adjusts the MCS offset for the UE to a safe setting providing considerably more robust transmission S5. It also resets the SAR statistics and clears the buffer used when calculating the SAR S5a. In the following transmissions it applies the new MCS offset when determining which MCS to use for a particular CQI index reported by the UE. The modification may for instance corresponding to increasing the robustness to two or more levels higher than used when the transport block was sent to the UE.

If a Hard or Soft ACK was received S2c; NO, the base station checks whether SAR is above the target SAR (e.g. SAR 10%), and if so S2d; YES it modifies the MCS offset to achieve for instance the next higher level of robustness than used when the transport block was sent to the UE, and uses that MCS offset when determining the MCS for following transmissions S3b. If the SAR is on or below target SAR S2d; NO, the base station checks how long time the SAR consistently has been below target. If this time exceeds some time T which may represent actual time, or TTIs for which Soft or Hard ACK have been received S2e; YES, the transmissions have been more robust than intended for some time, and the base station reduces the MCS offset to for instance to the next lower robustness level than used when the transport block was transmitted to the UE S3c. The parameter value of T may be configured e.g. from 0 (instantaneous) and upwards, allowing tuning of how inert the system is regarding reduction of robustness. It then applies the new MCS offset when determining the MCS to be used for following transmissions S4.

If the SAR has not been below target long enough S2e; NO, the base station uses the same MCS offset as used in previous transmission.

Note: In case the UE does not send ACK/NACK when expected the base station may count this as a NACK.

Within the context of this disclosure, the terms "wireless terminal" or "wireless device" encompass any terminal which is able to communicate wirelessly with another device, as well as, optionally, with an access node of a wireless network) by transmitting and/or receiving wireless signals. Thus, the term "wireless terminal" encompasses, but is not limited to: a user equipment, e.g. an LTE UE, a mobile terminal, a stationary or mobile wireless device for machine-to-machine communication, an integrated or embedded wireless card, an externally plugged in wireless card, a dongle etc. Throughout this disclosure, the term "user equipment" is sometimes used to exemplify various embodiments. However, this should not be construed as limiting, as the concepts illustrated herein are equally applicable to other wireless devices. Hence, whenever a "user equipment" or "UE" is referred to in this disclosure, this should be understood as encompassing any wireless terminal as defined above.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed example aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed example embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, performed in a radio network node, of receiving transmission feedback, the method comprising:
   transmitting, using a set of transmission properties, a transport block to a receiving wireless device; and
   receiving, from the receiving wireless device, an acknowledgement (ACK) confirming reception and successful decoding of the transport block in the receiving wireless device, wherein the ACK defines a decoding margin of the decoding.

2. The method of claim 1, comprising the step of:
   reconfiguring the transmission properties to be used for transmissions of one or more further transport blocks to the receiving wireless device, based on the margin of the decoding.

3. The method of claim 1, comprising the step of:
   transmitting, using the reconfigured transmission properties, one or more further transport blocks to the receiving wireless device.

4. The method of claim 1, wherein the reconfiguring comprises changing the robustness of transmissions of one or more further transport blocks to the receiving wireless device, in relation to robustness of the transmission of the transport block.

5. The method of claim 1, wherein reconfiguring comprises selecting transmission properties corresponding to a robustness which is higher than the robustness of the transmission of the transport block, if the margin of the decoding is below a predefined level.

6. The method of claim 1, wherein reconfiguring comprises selecting transmission properties corresponding to a robustness which is lower than the robustness of the transmission of the transport block, if the margin of the decoding is above a predefined level.

7. The method of claim 1, comprising:
calculating an accumulated decoding margin, representing the decoding margin of previous and present transport blocks transmitted, using the set of transmission properties, between the radio network node and the wireless device;
wherein the reconfiguring is based on the accumulated decoding margin.

8. The method of claim 1, wherein the transmission properties comprises one or several of the following properties: Modulation and Coding Scheme, Radio Access Technology, Multiple Input Multiple Output transmission modes, Beam forming, Pre-coding Matrix and Transmission Power.

9. The method of claim 1, wherein the margin of the decoding comprises an indication of a portion of a processing capacity of the radio network node that was used for the reception and/or decoding of the transport block.

10. The method of claim 1, wherein the receiving comprises receiving information defining one of several possible ACK levels, wherein each level corresponds to a decoding margin within a pre-defined range.

11. The method of claim 1, comprising the step of:
sending a request to enable an ACK reporting format indicating a margin of decoding, to the receiving wireless device.

12. The method of claim 1, comprising the step of:
receiving a request to enable an ACK reporting format indicating a margin of decoding from the receiving wireless device.

13. A nontransitory processor-readable storage medium comprising computer program code which, when executed in a programmable processing circuitry of a radio network node, causes the radio network node to execute a method of receiving transmission feedback, the method comprising:
transmitting, using a set of transmission properties, a transport block to a receiving wireless device; and
receiving, from the receiving wireless device, an acknowledgement (ACK) confirming reception and successful decoding of the transport block in the receiving wireless device, wherein the ACK defines a decoding margin of the decoding.

14. A radio network node configured for receiving transmission feedback, the radio network node comprising a radio communication interface and processing circuitry, wherein the processing circuitry is configured:
to transmit, through the radio communication interface using a set of transmission properties, a transport block to a receiving wireless device;
to receive, through the radio communication interface, from the receiving wireless device, an acknowledgement (ACK) confirming the reception and successful decoding of the transport block in the receiving wireless device, wherein the ACK defines a decoding margin of the decoding.

15. The radio network node of claim 14, wherein the processing circuitry is further configured to reconfigure the transmission properties to be used for transmissions of one or more further transport blocks to the receiving wireless device, based on the margin of the decoding.

16. The radio network node of claim 14, wherein the processing circuitry is further configured to transmit, using the reconfigured transmission properties, one or more further transport blocks to the receiving wireless device.

17. The radio network node of claim 14, wherein the processing circuitry is further configured to reconfigure the transmission properties to be used for transmissions of one or more further transport blocks to the receiving wireless device by changing the robustness of transmissions of one or more further transport blocks to the receiving wireless device, in relation to robustness of the transmission of the transport block.

18. The radio network node of claim 14, wherein the processing circuitry is further configured to reconfigure the transmission properties to be used for transmissions of one or more further transport blocks to the receiving wireless device by selecting transmission properties corresponding to a robustness which is higher than the robustness of the transmission of the transport block, if the margin of the decoding is below a predefined level.

19. The radio network node of claim 14, wherein the processing circuitry is further configured to reconfigure the transmission properties to be used for transmissions of one or more further transport blocks to the receiving wireless device by selecting transmission properties corresponding to a robustness which is lower than the robustness of the transmission of the transport block, if the margin of the decoding is above a predefined level.

20. The radio network node of claim 14, wherein the processing circuitry is further configured to calculate an accumulated decoding margin, representing the decoding margin of previous and present transport blocks transmitted, using the set of transmission properties, between the radio network node and the wireless device;
wherein the processing circuitry is further configured to reconfigure the transmission properties to be used for transmissions of one or more further transport blocks to the receiving wireless device based on the accumulated decoding margin.

21. The radio network node of claim 14, wherein the transmission properties comprises one or several of the following properties: Modulation and Coding Scheme, Radio Access Technology, Multiple Input Multiple Output transmission modes, Beam forming, Pre-coding Matrix and Transmission Power.

22. The radio network node of claim 14, wherein the margin of the decoding comprises an indication of a portion of a processing capacity of the radio network node that was used for the reception and/or decoding of the transport block.

23. The radio network node of claim 14, wherein the processing circuitry is further configured to receive information defining one of several possible ACK levels, wherein each level corresponds to a decoding margin within a pre-defined range.

24. The radio network node of claim 14, wherein the processing circuitry is further configured to send a request to enable an ACK reporting format indicating a margin of decoding, to the receiving wireless device.

25. The radio network node of claim 14, wherein the processing circuitry is further configured to receive a request to enable an ACK reporting format indicating a margin of decoding from the receiving wireless device.

26. A method, performed in a wireless device, of providing transmission feedback, wherein the method comprises:

receiving a transport block from the radio network node;
decoding the transport block; and
transmitting, to the radio network node, an acknowledgement (ACK) of the reception and successful decoding of the transport block, wherein the ACK defines a decoding margin of the decoding.

27. The method of claim 26, wherein the ACK defines one of several possible ACK levels, wherein each ACK level corresponds to a decoding margin within a pre-defined range.

28. The method of claim 26, wherein the margin of the decoding comprises an indication of a share of a processing capacity of the radio network node that was used for the reception or decoding of the transport block.

29. The method of claim 28, wherein the processing capacity is the processing capacity of one or more digital signal processor implementing physical layer processing.

30. The method of claim 26, wherein the margin of the decoding indicates a number of iterations of the decoding.

31. The method of claim 26, wherein the margin of the decoding indicates a number of hardware units being activated or used during the reception and/or decoding.

32. The method of claim 26, comprising:
sending a request to enable an ACK reporting format indicating a margin of decoding, to the radio network node.

33. The method of claim 26, comprising:
receiving a request to enable an ACK reporting format indicating a margin of decoding from a radio network node.

34. A nontransitory processor-readable storage medium comprising computer program code which, when executed in a programmable processing circuitry of a wireless device, causes the wireless device to execute a method of providing transmission feedback, wherein the method comprises:
receiving a transport block from the radio network node;
decoding the transport block; and
transmitting, to the radio network node, an acknowledgement (ACK) of the reception and successful decoding of the transport block, wherein the ACK defines a decoding margin of the decoding.

35. A wireless device configured for providing transmission feedback, the wireless device comprising a radio communication interface and processing circuitry, wherein the processing circuitry is configured:
to receive, through the radio communication interface, a transport block from the radio network node;
to decode the transport block; and
to transmit, through the radio communication interface, to the radio network node, an acknowledgement (ACK) confirming reception and successful decoding of the transport block, wherein the ACK defines a decoding margin of the decoding.

36. The wireless device of claim 35, wherein the ACK defines one of several possible ACK levels, wherein each ACK level corresponds to a decoding margin within a pre-defined range.

37. The wireless device of claim 35, wherein the margin of the decoding comprises an indication of a share of a processing capacity of the radio network node that was used for the reception or decoding of the transport block.

38. The wireless device of claim 37, wherein the processing capacity is the processing capacity of one or more digital signal processor implementing physical layer processing.

39. The wireless device of claim 35, wherein the margin of the decoding indicates a number of iterations of the decoding.

40. The wireless device of claim 35, wherein the margin of the decoding indicates a number of hardware units being activated or used during the reception and/or decoding.

41. The wireless device of claim 35, wherein the processing circuitry is configured:
to send a request to enable an ACK reporting format indicating a margin of decoding, to the radio network node.

42. The wireless device of claim 35, comprising:
to receive a request to enable an ACK reporting format indicating a margin of decoding from a radio network node.

* * * * *

UNITED STATES PATENT AND TRADEMARK OFFICE
CERTIFICATE OF CORRECTION

PATENT NO.        : 9,722,727 B2
APPLICATION NO.   : 14/430508
DATED             : August 1, 2017
INVENTOR(S)       : Andgart et al.

It is certified that error appears in the above-identified patent and that said Letters Patent is hereby corrected as shown below:

On the Title Page

In item (72), under "Inventors", in Column 1, Line 1, delete "Sodra" and insert -- Södra --, therefor.

In item (72), under "Inventors", in Column 1, Line 2, delete "Horby" and insert -- Hörby --, therefor.

In item (72), under "Inventors", in Column 1, Line 3, delete "Kavlinge" and insert -- Kävlinge --, therefor.

In the Drawings

In Fig. 1b, Sheet 1 of 8, delete "DL-SCH MCH" and insert -- DL-SCH MCS --, therefor.

In Fig. 4a, Sheet 4 of 8, delete Tag "10a" and insert Tag -- 10 --, therefor.

In Fig. 4b, Sheet 4 of 8, delete Tag "10a" and insert Tag -- 10 --, therefor.

In Fig. 4b, Sheet 4 of 8, delete "Wireless device 20" and insert -- Radio network 20 --, therefor.

In Fig. 4b, Sheet 4 of 8, in Step "S3", in Line 1, delete "Reconfiguation" and insert -- Reconfiguration --, therefor.

In the Specification

In Column 1, Line 21, delete "Terrestrial Access" and insert -- Terrestrial Radio Access --, therefor.

In Column 2, Line 36, delete "Data" and insert -- Downlink --, therefor.

In Column 4, Line 47, delete ""Soft ACK" Ratio," and insert -- "Soft ACK Ratio", --, therefor.

Signed and Sealed this
Nineteenth Day of December, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,722,727 B2

In Column 8, Line 37, delete "automatic" and insert -- automatic repeat --, therefor.

In Column 12, Line 62, delete "calculating S35" and insert -- calculating --, therefor.

In Column 17, Line 7, delete "processing circuitry 13" and insert -- processing circuitry 12 --, therefor.

In Column 17, Line 48, delete "processing circuitry 13" and insert -- processing circuitry 12 --, therefor.

In Column 19, Line 7, delete "network)" and insert -- network --, therefor.